June 26, 1962 A. E. BUSCH 3,041,004
MEASURING TAPE
Filed July 21, 1958
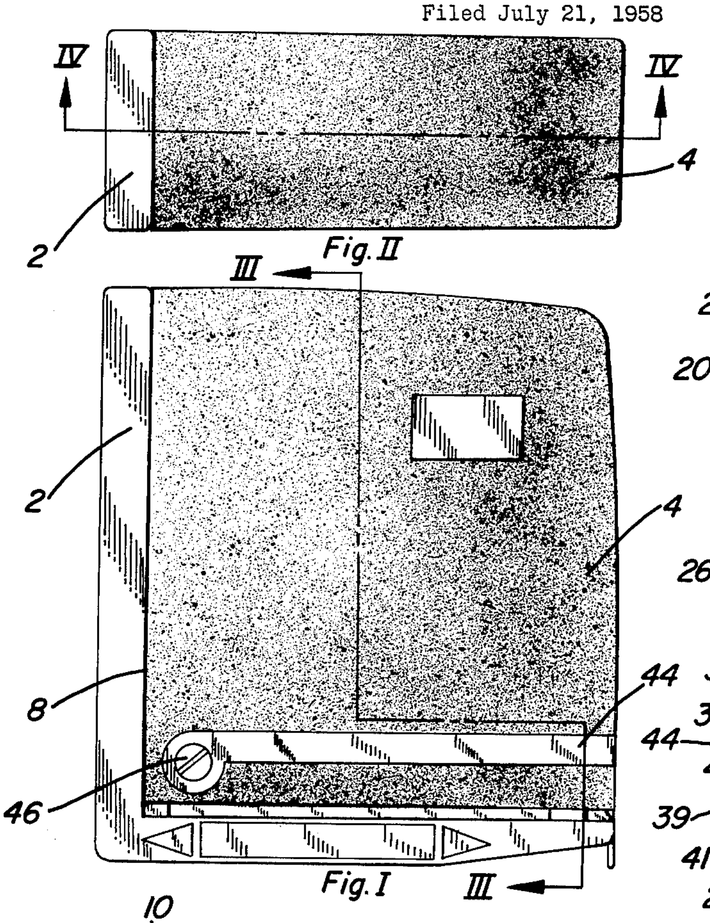
Fig. II Fig. I
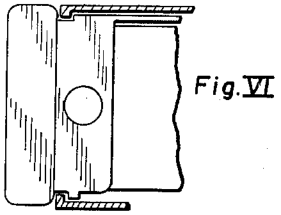
Fig. VI
Fig. III
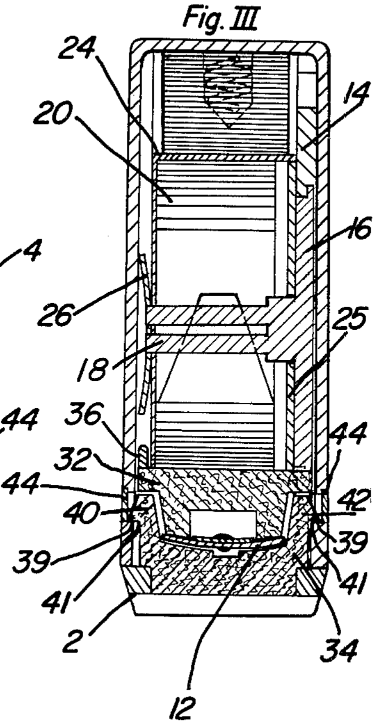
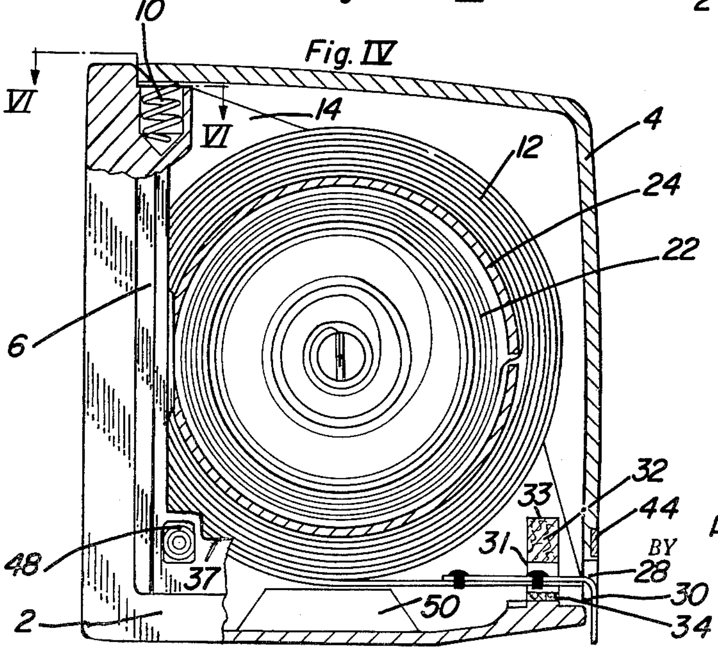
Fig. IV
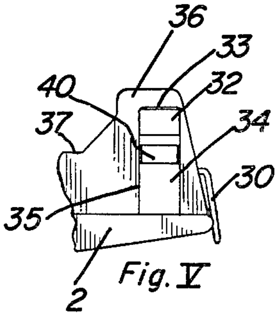
Fig. V
INVENTOR.
ALFRED E. BUSCH
BY [signature]
ATTORNEY

3,041,004
MEASURING TAPE

Alfred E. Busch, Short Hills, N.J., assignor to Keuffel & Esser Company, Hoboken, N.J., a corporation of New Jersey Filed July 21, 1958, Ser. No. 749,930
8 Claims. (Cl. 242—107.3)

This invention relates to a measuring tape and case combination of the type sometimes referred to as a tape rule which normally includes a measuring tape usually capable of measuring distances from six feet to twelve feet. More specifically the invention relates to a tape rule of the type wherein the measuring tape can be withdrawn from the case any selected distance and held there by a brake mechanism. After a measurement is made the tape can be automatically pulled back into the case by means of a spring motor inside the case or other retracting means without any pushing on the tape by the operator.

One of the main objects of the invention is to provide a measuring tape and case combination of this type in which the case is made of two portions which are free to have limited translational movement with respect to each other. The two portions of the case are normally held slightly apart by resilient means which causes brake members carried by the two portions to frictionally grasp the tape so that if the tape is extended any selected distance out of the case these brake members will hold it in that position. The tape is returned to the case by merely pressing the two portions of the case together against the action of the resilient means.

Another object of the invention is to provide a case for a measuring tape made up of two portions in which one of these portions is a base which carries the measuring tape per se, the retracting means and all of the essential mechanical parts of the tape and case combination. The other portion of the case is merely a cover which serves to enclose and protect the essential functioning means and which may also carry one of the brake members for operating the brake mechanism.

The above objects of the invention and the means for their attainment will be more fully understood after the following description taken in conjunction with the accompanying drawing in which:

FIG. I is a view in front elevation of the new measuring tape and case combination.

FIG. II is a view in plan of the new measuring tape and case combination.

FIG. III is a view in sectional side elevation taken along the line III—III of FIG. I and looking in the direction of the arrows.

FIG. IV is a view in partial sectional front elevation taken along the line IV—IV of FIG. II and looking in the direction of the arrows; the lower left-hand corner of the view being not in section but being shown with the cover removed.

FIG. V is a view in partial front elevation showing the lower right hand corner of the case with the cover removed.

FIGURE VI is a fragmentary section taken substantially on line VI—VI of the FIGURE IV showing the sliding tongue and groove connection between the cover and the base.

As shown in the drawings, the new tape case has an enclosure made essentially from two portions, the base 2 and the cover 4. As shown in FIG. IV the base 2 is provided with an elongated groove 6 running almost the entire length of the vertical portion of the L-shaped base 2. The cover 4 is provided with a strip extending inside the cover along the edge 8 shown in FIG. I which fits loosely the groove 6 in the base 2. This permits translational movement between the cover and the base 2 in a direction parallel to the groove 6. A similar groove is provided on the opposite side of the vertical portion of the L-shaped base and a similar strip is attached to the opposite edge of the cover 4. A resilient means in the form of the spring 10 normally holds the cover 4 slightly away from the lower part of the base 2. The action of this spring 10 is limited in a manner which will be described below.

The base 2 has in general an L-shape, the vertical portion of the L and the horizontal portion of the L serving to enclose the coiled measuring tape 12 on the bottom and left side. A web 14 extends between the vertical portion of the base 2 and the horizontal portion of the base 2 near the back of the enclosure. The web 14 carries a plate 16 riveted thereto which is cast integrally with the post 18 about which the retracting means 20 is mounted. The retracting means may be a coiled spring motor as shown in FIG. IV which is made up of a coiled spring 22 attached to the post 18 and to a drum 24. In the embodiment shown, this spring motor or retracting means tends at all times to turn the drum 24 in a clockwise direction and to wind the tape 12 around the drum 24 thereby retracting the measuring tape into the enclosure or case. The washer 25 fits between the base of the post 18 and the drum 24 and prevents the drum from tilting on the post 18.

A spring washer 26 shown in FIG. III is mounted between the drum 24 and the cover 4 around the post 18 which applies friction against the coiled spring motor on the post 18 to limit the speed thereof.

The cover 4 encloses the coiled measuring tape in the front, back, top and right side.

An opening is provided in the measuring tape case in its lower right-hand corner just above the right-hand end of the horizontal portion of the L-shaped member 2. This is partially formed by a notch 28 provided in the cover 4. The measuring tape 12 passes in and out of the tape case through this opening 28. The measuring tape 12 is provided with an end hook 30 which may be riveted to the tape as shown and which prevents the tape from being completely retracted into the case.

An upper brake member 32 and a lower brake member 34 are mounted in a rectangular opening 31 in the web 14 as shown in FIG. IV and also in a rectangular opening 35 in the short front web 36 shown in FIG. V. The edge of the front web 36 extends horizontally along the line 37 a portion of which is shown in both FIG. IV and FIG. V. The two rectangular openings 31 and 35 in the web members are aligned with each other in the direction perpendicular to the plane of the drawing. The upward movement of the upper brake member 32 is limited by the upper edges 33 of these two slots in the webs 14 and 36 which are a part of the base 2. The lower brake member 34 is provided with two projections 40 and 42 (FIG. III) which fit into two slots in the cover 4. In assembling the cover over the base 2 these projections 40 and 42 snap into the slots in the cover. The lower edges 39 of the slots in the cover 4 engage the lower edges 41 of the projections 40 and 42 so that the action of the spring 10 in forcing the cover upward also carries the lower brake member 34 upward with the cover 4 against the underside of the tape 12. Preferably the upper surface of the lower brake member 34 which engages the under surface of the tape 12 is concavely formed to match the under convex surface of the concavely convexly formed measuring tape 12. This surface which engages the under surface of the tape will be referred to hereinafter as the friction surface of the lower brake member 34. The brake member is undercut at the center of this surface in order to permit the rivets used for securing the end hook 30 to the tape to pass in and out of the case past the lower brake member 34. Likewise the upper brake member 32 may be provided with a convex friction surface to engage the concave upper graduated surface of the measuring tape 12. This friction surface is also cut away at the center to permit the end hook 30 and the heads of the rivets holding the end hook onto the tape to pass by. Preferably both brake members 32 and 34 are made of some soft friction material such as molded nylon. However, one or both of these members may be formed integrally with the base 2 or the cover 4.

When the cover 4 has been assembled over the base 2, the strip 44 is assembled in a groove in the cover 4 as shown to cover up the slots in the cover 4 which engage the projections 40 and 42. A screw 46 is used for attaching one end of the strip 44 and a similar screw is used for attaching the other end of the strip 44 on the opposite side of the cover 4. These screws also extend into oblong slots 48 in both the front web 36 and the rear web 14 of the base 2 and prevent the cover 4 from being easily pulled off the base 2.

A projection or pair of projections 50 is provided inside of the horizontal portion of the L-shaped base member 2 in order to prevent the tape from catching on the bottom of the case. This projection 50 forces the tape 12 to move tangentially to the tape which has been coiled up on the drum 24.

Having thus described the invention what is claimed is:

1. A measuring tape and case combination including an enclosure having an opening, a coiled spring motor within said enclosure, a measuring tape attached on one end to said spring motor and having a free end extending through said opening, said enclosure comprising a base and cover which are loosely held together in a manner to permit limited translational movement with respect to each other in a direction generally perpendicular to the portion of said measuring tape extending through said opening, resilient means normally holding said base and said cover apart, an upper brake member having a friction surface for engaging the upper graduated surface of said measuring tape mounted above said opening, means on said base for limiting the upward movement of said upper brake member, a lower brake member extending below said opening having a friction surface for engaging the underside of said tape, means on said cover for pulling said lower brake member upward, so that when said base and cover are held apart by the action of said resilient means said lower brake member is pulled up toward said upper brake member and the engagement of said friction surfaces with said measuring tape limits the action of said resilient means and will hold the free end of the measuring tape out of the case against the action of said spring motor so that when said base and cover are pressed together said lower brake member is moved downward away from said upper brake member separating said friction surfaces and releasing said tape to be retracted into the case by said spring motor.

2. A measuring tape and case combination including an enclosure having an opening, a coiled spring motor within said enclosure, a measuring tape attached on one end to said spring motor and having a free end extending through said opening, said enclosure comprising an L-shaped base and a cover having raised strips and recessed grooves extending along the length of the vertical portion of said L-shaped base to loosely hold said base and cover together in a manner to permit translational movement in a direction generally perpendicular to the portion of said measuring tape extending through said opening, resilient means normaly holding said base and said cover apart, an upper brake member having a friction surface for engaging the upper graduated surface of said measuring tape mounted above said opening, means on said base for limiting the upward movement of said upper brake member, a lower brake member extending below said opening having a friction surface for engaging the under side of said tape, means on said cover for pulling said lower brake member upward so that when said base and cover are held apart by the action of said resilient means and said lower member is pulled up toward said upper brake member, the engagement of said friction surfaces with said measuring tape limits the action of said resilient means and will hold the free end of the tape out of the case against the action of said spring motor so that when said base and cover are pressed together said lower brake member is moved downward away from said upper brake member separating said friction surfaces and releasing said tape to be retracted into the case by said spring motor.

3. A measuring tape and case combination comprising an L-shaped base having a reenforcing web between the vertical and horizontal portions of said L-shaped base, a coiled spring motor mounted on said web, a cover having a front surface, a rear surface, a top surface and an edge surface mounted between the vertical and horizontal portions of said L-shaped base to enclose said web and said coiled spring motor but leaving an opening above the free end of the horizontal portion of said L-shaped base, a measuring tape attached at one end to said spring motor and having a free end extending through said opening, said L-shaped base and said cover having raised strips and recessed grooves extending along the length of the vertical portion of said L-shaped base to loosely hold said base and cover together in a manner to permit translational movement in a direction generally perpendicular to the portion of said measuring tape extending through said opening, resilient means normally holding said base and said cover apart, an upper brake member having a friction surface for engaging the upper graduated surface of said measuring tape mounted above said opening, means on said base for limiting the upward movement of said upper brake member, a lower brake member extending below said opening having a friction surface for engaging the under side of said tape, means on said cover for pulling said lower brake member upward, so that when said base and cover are held apart by the action of said resilient means and said lower member is pulled up toward said upper brake member, the engagement of said friction surfaces with said measuring tape limits the action of said resilient means and will hold the free end of the tape out of the case against the action of said spring motor so that when said base and cover are pressed together said lower brake member is moved downward away from said upper brake member separating said friction surfaces and releasing said tape to be retracted into the case by said spring motor.

4. A measuring tape comprising a base for positioning against a surface on which a length is to be measured, a cover mounted on said base for relative movement with respect to said base in a direction toward and away from a surface to be measured, biasing means to urge said cover away from said base and the surface to be measured, a drum rotatably mounted on said base, a normally concave-convex cross section resilient tape coiled on said drum with the end of said tape projecting laterally from said base and said cover through an opening in said base and cover with the convex surface adjacent the surface to be measured, said tape being provided with graduations on one surface, spring means on said base for causing said tape to be wound onto said drum and normally urging said tape into wound condition, a brake element mounted on and moving with said base for engaging one surface of said tape, a cooperating brake surface mounted on and connected to said cover for engaging the other surface of said tape adjacent the opening in said base and cover through which the tape is extended and retracted, the brake element and surface being normally applied to said tape surfaces by the said biasing means, and being released by the movement of said cover toward said base and toward the surface being measured whereby a user of the tape may grasp the cover to retain the measuring tape in proper relation to the surface being measured and by the application of pressure on the cover in a direction toward the surface being measured release the brake permitting extension of the tape or retraction thereof or to retain the tape in a definite position whereby the tape may be accurately read while the tape remains relatively stiff in the extended portion thereof, the brake being arranged to maintain the natural concave-convex shape of the tape to improve the rigidity of the extended tape.

5. A measuring tape and case combination including an enclosure having an opening, retracting means within said enclosure, a measuring tape attached on one end to said retracting means and having a free end extending through said opening, said enclosure comprising a base and a cover, resilient means acting between said base and said cover, two friction surfaces for engaging the top and bottom surfaces of said measuring tape, means on said cover for relatively moving said friction surface for engaging the bottom surface of said tape and means on said base for relatively moving said friction surface for engaging the top surface of said tape so that when said base and cover are pressed together against the action of said resilient means said friction surfaces for engaging the top and bottom surfaces of said tape are moved apart whereby said tape is released from engagement with said friction surfaces and retracted into the case, the engagement of said friction surfaces with said tape otherwise limiting the action of said resilient means on said base and cover and holding the free end of the measuring tape out of the case against the action of said retracting means.

6. A measuring tape and case combination including an enclosure having an opening, a coiled spring motor within said enclosure, a measuring tape attached on one end to said spring motor and having a free end extending thru said opening, said enclosure comprising two portions which are mounted for limited translational movement with respect to each other, resilient means acting between said two portions, two friction surfaces for engaging the upper graduated surface of said measuring tape and the under surface of said tape respectively, means on one of said portions of said enclosure for relatively moving the friction surface engaging the upper graduated surface of said measuring tape and means on the other of said portions of said enclosure for moving said friction surface engaging said under surface of said tape so that when said enclosure portions are pressed in the direction generally perpendicular to said surfaces of said measuring tape against the action of said resilient means said friction surfaces are moved apart whereby said tape is released from engagement with said friction surfaces and retracted into the case, the engagement of said friction surfaces with said tape otherwise limiting the action of said resilient means and holding the free end of the measuring tape out of the case against the action of said spring motor.

7. The invention according to claim 6 in which one of the portions of said case is an L-shaped base having a reinforcing web between the vertical and horizontal portions of said L-shaped base and the coiled spring motor is mounted on said web.

8. A measuring tape and case including an enclosure having an opening, a coiled spring motor within said enclosure, a measuring tape attached on one end to said spring motor and having a free end extending thru said opening, said enclosure comprising a base and a cover which are mounted for limited translational movement with respect to each other, resilient means acting between said base and said cover, two friction surfaces for engaging the upper graduated surface of said measuring tape and the under surface of said measuring tape respectively, means on said cover of said enclosure for relatively moving the friction surface engaging the under surface of said tape and means on said base for moving the friction surface engaging the upper surface of said measuring tape so that when said base and cover are pressed together said friction surfaces are moved apart whereby said tape is released from engagement with said friction surfaces and retracted into the case, the engagement of said friction surfaces with said measuring tape limiting the resilient action of said resilient means and holding the free end of said measuring tape out of the case against the action of said spring motor.

References Cited in the file of this patent

UNITED STATES PATENTS

| | | |
|---|---|---|
| 1,913,722 | Perrin | June 13, 1933 |
| 2,067,760 | Harvey | Jan. 12, 1937 |
| 2,575,354 | Mills | Nov. 20, 1951 |
| 2,684,534 | Ljungberg | July 27, 1954 |
| 2,814,881 | Ljungberg | Dec. 3, 1957 |